US007935750B2

(12) United States Patent
Kogure et al.

(10) Patent No.: US 7,935,750 B2
(45) Date of Patent: May 3, 2011

(54) POLYCARBONATE LIGHT DIFFUSING RESIN COMPOSITION

(75) Inventors: Masami Kogure, Chiba (JP); Hiroshi Kawato, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 741 days.

(21) Appl. No.: 11/577,723

(22) PCT Filed: Oct. 20, 2005

(86) PCT No.: PCT/JP2005/019277
§ 371 (c)(1),
(2), (4) Date: Nov. 27, 2007

(87) PCT Pub. No.: WO2006/043618
PCT Pub. Date: Apr. 27, 2006

(65) Prior Publication Data
US 2009/0116115 A1    May 7, 2009

(30) Foreign Application Priority Data

Oct. 22, 2004 (JP) ................................ 2004-307993

(51) Int. Cl.
| C08K 3/36 | (2006.01) |
| C08K 3/40 | (2006.01) |
| C08K 5/11 | (2006.01) |
| C08K 5/15 | (2006.01) |
| C08K 5/18 | (2006.01) |
| C08K 5/34 | (2006.01) |
| C08K 5/50 | (2006.01) |
| C08K 5/101 | (2006.01) |
| C08K 5/521 | (2006.01) |
| C08K 5/1515 | (2006.01) |

(52) U.S. Cl. .......... 524/91; 524/114; 524/140; 524/154; 524/240; 524/290; 524/314; 524/493; 524/494; 524/611

(58) Field of Classification Search ............... 524/91, 524/129, 140, 502, 537, 611, 114, 154, 240, 524/290, 314, 493, 494
See application file for complete search history.

(56) References Cited

U.S. PATENT DOCUMENTS

| 5,352,747 | A * | 10/1994 | Ohtsuka et al. | ............... 525/464 |
| 6,808,804 | B2 * | 10/2004 | Hotaka et al. | ................. 428/357 |
| 7,009,001 | B2 * | 3/2006 | Kawato et al. | ................ 525/146 |
| 7,098,263 | B2 * | 8/2006 | Mitsunaga et al. | ........... 524/445 |
| 2003/0055200 | A1 * | 3/2003 | Ando et al. | .................... 528/196 |
| 2003/0165666 | A1 * | 9/2003 | Fujiwara et al. | ............. 428/143 |

FOREIGN PATENT DOCUMENTS

| JP | 11 158364 | 6/1999 |
| JP | 11 181267 | 7/1999 |
| JP | 2001 214049 | 8/2001 |
| JP | 2002 003710 | 1/2002 |
| JP | 2002 60609 | 2/2002 |
| JP | 2003 025406 | 1/2003 |
| JP | 2003 26888 | 1/2003 |
| JP | 2005 112963 | 4/2005 |
| JP | 2005 259593 | 9/2005 |
| JP | 2005 298710 | 10/2005 |

OTHER PUBLICATIONS

U.S. Appl. No. 12/305,207, filed Dec. 17, 2008, Kogure, et al.
U.S. Appl. No. 11/994,031, filed Dec. 27, 2007, Kawato, et al.

* cited by examiner

*Primary Examiner* — Kriellion A Sanders
(74) *Attorney, Agent, or Firm* — Oblon, Spivak, McClelland, Maier & Neustadt, L.L.P.

(57) ABSTRACT

The present invention provides: a polycarbonate light diffusing resin composition in which a first discoloration is a little, and particularly a photo-deterioration caused by a cold-cathode tube as a light source of liquid crystal displays is suppressed; and a light diffuser panel obtained by molding the same.

The polycarbonate light diffusing resin composition comprises: (A) 100 parts by mass of an aromatic polycarbonate resin; (B) 0.01 to 10 parts by mass of a light diffusing agent; and (C) 0.05 to 5 parts by mass of a light-resisting agent having a maximum absorption wavelength at 290 to 330 nm in an ultraviolet light absorption spectrum and the light diffuser panel is a light diffuser panel having a thickness of 0.5 to 2 mm and obtained by molding the polycarbonate light diffusing resin composition.

9 Claims, No Drawings

POLYCARBONATE LIGHT DIFFUSING RESIN COMPOSITION

CROSS-REFERENCE TO RELATED APPLICATIONS

This application is a 371 of PCT/JP05/19277 filed Oct. 20, 2005 and claims the benefit of JP 2004-307993 filed Oct. 22, 2004.

TECHNICAL FIELD

The present invention relates to a polycarbonate light diffusing resin composition and a light diffuser panel, more specifically, to a polycarbonate light diffusing resin composition which is excellent in light resistance, particularly in light resistance by which a deterioration caused by an ultraviolet light emitted from a fluorescent lamp (cold-cathode tube) is suppressed, and which is advantageous for use in light diffuser panels in the field of liquid crystal displays and the like, optical elements such as optical lenses, light guide panels (light guides) and light diffuser panels, and replacements for glass articles such as a cover for street lamps and a glass for vehicles and building materials; and to a light diffuser panel obtained by molding the same.

BACKGROUND ART

In recent years, the application of liquid crystal displays (LCD) does not remain in note-book type PC's (personal computers) and monitor displays, but has been extended to in TVs. With respect to a light diffuser panel (having a thickness of 1 to 3 mm) used for a direct type-backlight provided in a T.V. in which a brightness is particularly required, the light diffuser panel having a display size of about 508 mm (20 inches) is mainly produced using an acrylic resin. However, since an acrylic resin has poor heat resistance and is highly hygroscopic, then has poor dimensional stability, a disadvantage is caused wherein a warpage deformation is caused in a light diffuser panel having a large screen size. Therefore, in recent years, a polycarbonate (hereinafter, abbreviated as "PC" sometimes) resin which is more excellent in heat resistance and moisture absorptivity than an acrylic resin has been used as a matrix resin for a light diffusion plate and de and thereof is being enlarged (for example, refer to Patent documents 1 and 2).

However, the PC resin has such a disadvantage that it has a poorer light resistance than that of an acrylic resin, while the PC resin is superior in heat resistance and hygroscopicity to an acrylic resin. By incorporating an ultraviolet light absorber which has been conventionally incorporated in the PC resin composition, the PC resin composition is likely to be first-discolored (discoloring towards yellow) and a conventional ultraviolet light absorber does not correspond to a wavelength region of ultraviolet light of 350 nm or less for a cold cathode tube as a light source for a liquid crystal display, because the conventional ultraviolet light absorber is intended for an outdoor exposure (for preventing an adverse effect by the sun light), so that a disadvantage has been conventionally caused wherein the transmittance of the PC resin composition is lowered in a lower wavelength region.

Patent Document 1 Japanese Patent Laid-Open Publication No. H11-158364,
Patent Document 2: Japanese Patent Laid-Open Publication No. H10-73725.

DISCLOSURE OF THE INVENTION

Problems to be Solved by the Invention

The present invention has been completed in consideration of the above situations and an object of the present invention is to provide a polycarbonate light diffusing resin composition in which a first discoloration is a little, and particularly a photo-deterioration caused by a cold-cathode tube as a light-source for liquid crystal displays is suppressed, and a light diffuser panel obtained by molding the resin composition.

Means for Solving the Problems

The present inventors have made extensive and intensive studies with a view toward solving the aforementioned problems. As a result, it has been found that by incorporating a light diffusing agent and a light-resisting agent having a maximum absorption wavelength in a specific region in an ultraviolet absorption spectrum, in a composition of an aromatic PC resin, a PC light diffusing resin composition in which not only a first discoloration is a little, but also a photo-deterioration caused by a cold-cathode tube is suppressed, can be obtained. The present invention has been completed based on this finding.

Namely, the present invention provides the following polycarbonate light diffusing resin composition and a light diffuser panel.

1. A polycarbonate light diffusing resin composition comprising:
    (A) 100 parts by mass of an aromatic polycarbonate resin;
    (B) 0.01 to 10 parts by mass of a light diffusing agent; and
    (C) 0.05 to 5 parts by mass of a light-resisting agent having a maximum absorption wavelength at 290 to 330 nm in an ultraviolet absorption spectrum.
2. The polycarbonate light diffusing resin composition according to item 1 above, further comprising (D) 0.01 to 1 part by mass of a thermoplastic acrylic resin having a viscosity-average molecular weight of 1,000 to 200,000.
3. The polycarbonate light diffusing resin composition according to item 1 or 2 above, further comprising (E) 0.001 to 1 part by mass of a stabilizer comprising phosphorus.
4. The polycarbonate light diffusing resin composition according to any one of items 1 to 3 above, further comprising (F) 0.01 to 3 parts by mass of an organopolysiloxane having a refractive index, the difference between the refractive indices of the organopolysiloxane (F) and the aromatic polycarbonate resin of component (A) being 0.1 or less and/or (G) 0.001 to 1 part by mass of an alicyclic epoxy compound.
5. The polycarbonate light diffusing resin composition according to any one of items 1 to 4 above, wherein the light diffusing agent of component (B) is one or more selected from the group consisting of cross-linked polymethyl methacrylate resin particles, silicone resin particles, polyorganosilsesquioxane particles, silica particles, quartz particles, silica fibers, quartz fibers, and glass fibers.
6. The polycarbonate light diffusing resin composition according to any one of items 1 to 5 above, wherein the light-resisting agent of component (C) is one or more selected from the group consisting of compounds comprising a malonate, compounds comprising an oxalic anilide, and acrylic polymers having a side chain having a benzotriazole skeleton.
7. The polycarbonate light diffusing resin composition according to any one of items 3 to 6, wherein the stabilizer comprising phosphorus of component (E) is one or more selected from the group consisting of phosphate compounds and aromatic phosphine compounds.

8. A light diffuser panel having a thickness of 0.5 to 2 mm obtained by molding the polycarbonate light diffusing resin composition according to any one of items 1 to 7 above.

EFFECT OF THE INVENTION

According to the present invention, a PC light diffusing resin composition in which a first discoloration is a little and a photo-deterioration caused by a cold-cathode tube is suppressed can be obtained.

BEST MODE FOR CARRYING OUT THE INVENTION

In the PC light diffusing resin composition (hereinafter referred to as "PC resin composition" in some cases) of the present invention, examples of the aromatic PC resin of component (A) include resins produced usually by reacting a dihydric phenol with a polycarbonate precursor such as phosgene and a carbonate compound. Specifically, such resins are produced, for example in a solvent such as methylene chloride, in the presence of a known acid-acceptor or a molecular weight modifier, optionally with the addition of a branching agent, and according to a reaction of a dihydric phenol with a carbonate precursor such as phosgene or according to ester exchange reaction between a dihydric phenol and a carbonate precursor such as diphenyl carbonate.

Examples of the dihydric phenol include various compounds. Among them, particularly preferred is 2,2-bis(4-hydroxyphenyl)propane (popular name: bisphenol A). Examples of the bisphenols other than bisphenol A include bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, and 2,2-bis(4-hydroxy-3,5-tetrabromophenyl)propane, bis(hydroxyaryl)cycloalkanes such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers such as 4,4'-dihydroxyphenyl ether and 4,4-dihydroxy-3,3-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; and dihydroxydiphenyls such as 4,4'-dihydroxydiphenyl. These dihydric phenols can be used individually or in combination of two or more kinds.

Examples of the carbonate compound include diaryl carbonates such as diphenyl carbonate and dialkyl carbonates such as dimethyl carbonate and diethyl carbonate. Examples of the molecular weight modifier include various compounds used usually for a polycarbonate polymerization. Specific examples of monohydric phenols as a molecular weight modifier include phenol, o-n-butyl phenol, m-n-butyl phenol, p-n-butyl phenol, o-isobutyl phenol, m-isobutyl phenol, p-isobutyl phenol, o-tert-butyl phenol, m-tert-butyl phenol, p-tert-butyl phenol, o-n-pentyl phenol, m-n-pentyl phenol, p-n-pentyl phenol, o-n-hexyl phenol, m-n-hexyl phenol, p-n-hexyl phenol, p-tert-octyl phenol, o-cyclohexyl phenol, m-cyclohexyl phenol, p-cyclohexyl phenol, o-phenyl phenol, m-phenyl phenol, p-phenyl phenol, o-n-nonyl phenol, m-nonyl phenol, p-n-nonyl phenol, o-cumyl phenol, m-cumyl phenol, p-cumyl phenol, o-naphthyl phenol, m-naphthyl phenol, p-naphthyl phenol, 2,5-di-tert-butyl phenol, 2,4-di-tert-butyl phenol, 3,5-di-tert-butyl phenol, 2,5-dicumyl phenol, 3,5-dicumyl-phenol, p-cresol, bromophenol, tribromophenol. Hong these monohydric phenols, p-tert-butyl phenol, p-cumyl phenol, and p-phenyl phenol are preferably used.

In addition, examples of the branching agent include compounds having three or more functional groups such as 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglucinol, trimellitic acid, and isatin bis(o-cresol).

Usually, the polycarbonate used in the present invention has a viscosity average molecular weight of preferably from 10,000 to 100,000, more preferably from 15,000 to 40,000. The viscosity average molecular weight (Mv) is obtained by a method comprising measuring a viscosity of a methylene chloride solution of the polycarbonate at 20° C. using an Ubbellohde viscometer; obtaining an intrinsic-viscosity [η] from the above-measured viscosity; and calculating Mv from the above-obtained [η] and the following equation:

$$[\eta]=1.23\times10^{-5}Mv^{0.83}.$$

In the PC light diffusing resin composition of the present invention, the light diffusing agent of component (B) may be any compound which is optically transparent and comprises a solid having a refractive index different from that of the aromatic PC resin of component (A). These light diffusing agents can be used individually or in combination of two or more kinds. The average particle diameter of the light diffusing agent is generally 1 to 100 μm, preferably 2 to 50 μm. When the average particle diameter of the light diffusing agent is 1 to 100 μm, there is such an advantage that the light diffusing agent has high light transmittance and satisfactory light diffusion properties.

Specific examples of the light diffusing agent include cross-linked polymethyl methacrylate (cross-linked PMMA) resin particles, silicone resin particles, polyorganosilsesquioxane particles, silica particles, quartz particles, silica fibers, quartz fibers, glass fibers, silica beads, silicone resin beads, glass beads, and hollow beads, amorphous powders and plate powders comprising the same material as the above-noted materials. These light diffusing agents can be used individually or in combination of two or more kinds.

According to the present invention, from the viewpoint of the transparency and refractive index, cross-linked PMMA resin particles, silicone resin particles, polyorganosilsesquioxane particles, silica particles, quartz particles, silica fibers, quartz fibers, and glass fibers are preferred and cross-linked PMMA resin particles silicone resin particles, polyorganosilsesquioxane particles, silica particles, and quartz particles are particularly preferred.

The mixing amount of the light diffusing agent of component (B) is necessary to be 0.01 to 10 parts by mass and is preferably from 0.05 to 5 parts by mass, relative to 100 parts by mass of the aromatic PC resin of component (A). When the mixing amount of the light diffusing agent is 0.01 part by mass or more, the PC resin composition exhibits satisfactory light diffusion properties, so that a molded article such as a PC light diffuser panel produced by molding the PC resin composition according to the present invention has a high luminance. On the other hand, when the mixing amount is 10 parts by mass or less, appropriate light diffusion properties of the PC resin composition can be obtained, so that a molded article having a high luminance can be obtained.

In the PC light diffusing resin composition according to the present invention, the light-resisting agent of component (C) is an ultraviolet light absorber having a maximum absorption wavelength at 290 to 330 nm in an ultraviolet absorption spectrum. Preferred examples of the light-resisting agents include one or more compounds selected from the group consisting of compounds comprising malonates, compounds comprising oxalic anilide, and acrylic polymers having a side chain containing a benzotriazole skeleton. These light-resisting agents can be used individually or in combination of two or more kinds.

Examples of the compounds comprising malonates include benzylidenebisdiethyl malonate and 4-methoxyphenylmethylenedimethyl ester. Examples of the compounds comprising oxalylic anilide include oxalylic anilide compounds having a hydrocarbon group with 1 to 12 carbon atoms. Examples of the acrylic polymers having a side chain containing a benzotriazole skeleton include a compound in which a 2-(5-tert-octyl-2-hydroxyphenyl) benzotriazole group is bonded to a polymethylmethacrylate (PMMA) side chain.

The mixing amount of the light-resisting agent of component (C) needs to be 0.05 to 5 parts by mass and is preferably 0.1 to 3 parts by mass, relative to 100 parts by mass of the aromatic PC resin of component (A). When the mixing amount of the light-resisting agent is 0.5 part by mass or more, the PC resin composition exhibits a satisfactory light resistance and when the mixing amount is 2 parts by mass or less, the initial tone of the resin composition can be maintained.

In the PC resin composition according to the present invention, a thermoplastic acrylic resin having a viscosity average molecular weight of 1,000 to 200,000 as component (D) is preferably incorporated. When the viscosity average molecular weight is in the above-noted range, component (D) has a satisfactory compatibility with the aromatic PC resin of component (A). The viscosity average molecular weight is obtained by measuring according to the above-noted method.

The thermoplastic acrylic resin used in the present invention is referred to a polymer comprising as a recurring unit a monomer unit of a monomer such as acrylic acid, acrylate, acrylonitrile, and derivatives thereof, and is referred also to a homopolymer comprising any one of the above-noted recurring units, a copolymer comprising two or more of the above-noted recurring units, or a copolymer of any one of the above-noted monomers with styrene, butadiene or the like. Specific examples of the thermoplastic acrylic resin include a polyacrylic acid, a polymethyl methacrylate (PMMA), a polyacrylonitrile, an ethyl acrylate-acrylic acid-2-chloroethylacrylate copolymer, an acrylic acid-n-butyl-acrylonitrile copolymer, an acrylonitrile-styrene copolymer, an acrylonitrile-butadiene copolymer, anacrylonitrile-butadiene-styrene copolymer. Among them, particularly preferred is a polymethyl methacrylate (PMMA).

As the polymethyl methacrylate (PMMA), a known one can be used, which is usually produced by a bulk polymerization of a methyl methacrylate monomer in the presence of a polymerization initiator comprising a peroxide or an azo-compound.

The mixing amount of the thermoplastic acrylic resin of component (D) is usually about 0.01 to about 1 part by mass, preferably 0.02 to 0.8 part by mass relative to 100 parts by mass of the aromatic PC resin of component (A). When the mixing amount of the acrylic resin is 0.01 part by mass or more, the light guiding property of the aromatic PC resin of component (A) as a base resin matrix is improved and as a result the luminance of the PC resin composition is improved. On the other hand, when the mixing amount is 1 part by mass or less, the phase separation of the acrylic resin component becomes appropriate and the PC resin composition does not become opaque, so that the light guiding property of the aromatic PC resin of component (A) becomes satisfactory and a satisfactory luminance of the PC resin composition can be obtained.

In the PC resin composition according to the present invention, the following components (E), (F) and (G) can be optionally incorporated.

By incorporating the stabilizer comprising phosphorus of component (E), the thermal stability of the PC resin composition according to the present invention during molding thereof can be improved. The stabilizer comprising phosphorus is a compound selected from the group consisting of phosphoric acid compounds and aromatic phosphine compounds and these stabilizers can be used individually or in combination of two or more kinds. Examples of the phosphoric acid compounds include phosphorous acid, phosphoric acid, phosphonous acid, phosphonic acid, and esters thereof. Specific examples of the phosphoric acids include triphenyl phosphite, tris(nonylphenyl)phosphate, tris(2,4-di-tert-butylphenyl)phosphite, tridecyl phosphite, trioctyl phosphite, triocatadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, dibutyl phosphate, dioctyl phosphate, disopropyl phosphate, tetrakis(2,4-di-tert-butylphenyl) 4,4'-biphenylene diphosphinate, dimethylbenzenephosphonate, diethyl benzenephosphonate, dipropyl benzenephosphonate. Among them, tris-nonylphenyl phosphite, trimethyl phosphate, tris(2,4-di-tert-butylphenyl) phosphite, and dimethyl benzenephosphonate are preferred.

Examples of the aromatic phosphine compounds among the above-exemplified stabilizers comprising phosphorus of component (E) used in the present invention include aromatic phosphine compounds represented by Formula (1):

$$P—(X)_3 \qquad (1)$$

wherein, X represents a hydrocarbon group and at least one of three Xs is an aryl group ha gin 6 to 18 carbon atoms which may have a substituent. Specific examples of the aromatic phosphine compounds include triphenyl phosphine, diphenylbutyl phosphine, diphenyloctadecyl phosphine, tris(p-tolyl) phosphine, tris(p-nonylphenyl)phosphine, tris(naphthyl)phosphine, diphenyl-hydroxymethyl) phosphine, diphenyl(acetoxymethyl) phosphine, diphenyl(β-ethylcarboxyethyl)phosphine, tris(p-chlorophenyl)phosphine, tris(p-fluorophenyl)phosphine, diphenylbenzyl phosphine, diphenyl-β-cyanoethyl phosphine, diphenyl(p-hydroxyphenyl) phosphine, diphenyl-1,4-dihydroxyphenyl-2-phosphine, phenylnaphthylbenzyl phosphine. Among them, particularly preferred is triphenyl phosphine.

The mixing amount of the stabilizer comprising phosphorus of component (E) is usually about 0.001 to about 1 part by mass, preferably 0.001 to 0.5 part by mass, relative to 100 parts by mass of the aromatic PC resin of component (A).

When the mixing amount is 0001 part by mass or more, the thermal stability of the PC resin composition during molding thereof becomes satisfactory. On the other hand, when the mixing amount is 1 part or less, the balance between the effect and the economic efficiency becomes satisfactory.

The organopolysiloxane of component (F) has a refractive index different from that of the aromatic PC resin of component (A) by 0.1 or less and by incorporating the organopolysiloxane, the thermal stability of the PC resin composition according to the present invention during molding thereof can be improved. In addition, by setting the refractive index difference to the above-noted value, there can be obtained the effect of preventing lowering of the transparency and light transmittance of the PC resin composition.

Preferred examples of the organopolysiloxane include an organopolysiloxane having a phenyl group, a diphenyl group, a vinyl group, or an alkoxy group (e.g., methoxy, ethoxy, n-propoxy, isopropoxy, n-butoxy, isobutoxy, sec-butoxy, tert-butoxy, various pentoxy, various heptoxy, various octoxy groups), an organopolysiloxane having a phenyl group and a diphenyl group, an organopolysiloxane having a vinyl group and an alkoxy group, and an organopolysiloxane having a phenyl group an alkoxy group, and a vinyl group. More preferred is an organopolysiloxane having a phenyl group, a methoxy group, and a vinyl group.

The mixing amount of the organopolysiloxane of component (F) is usually about 0.01 to about 3 parts by mass, preferably 0.02 to 1 part by mass relative to 100 parts by mass of the aromatic PC resin of component (A). When the mixing amount is 0.01 part by mass or more, the thermal stability of the PC resin composition during molding thereof becomes satisfactory. On the other hand, when the mixing amount is 3 parts by mass or less, the balance between the effect and the economic efficiency becomes satisfactory.

By incorporating the alicyclic epoxy compound of component (G), the steam resistance of the PC resin composition can be improved. The alicyclic epoxy compound is referred to a cycloaliphatic compound having an alicyclic epoxy group which is an epoxy group in which one oxygen atom is added to an ethylene bond in an aliphatic ring and specific preferred examples thereof include the compounds represented by the following formulas (2) to (11):

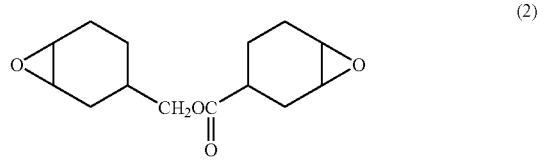

(2)

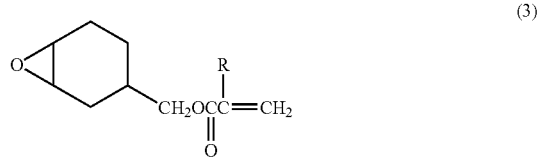

(3)

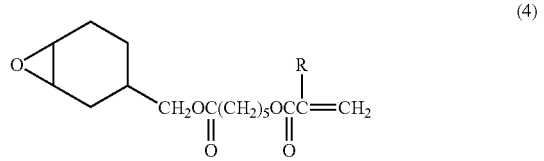

(4)

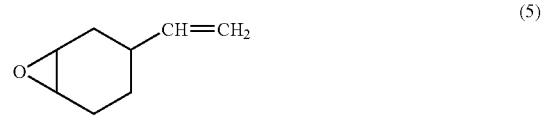

(5)

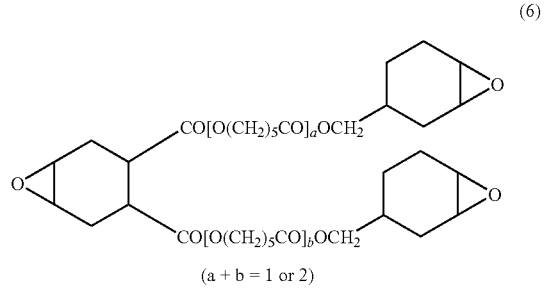

(6)

(a + b = 1 or 2)

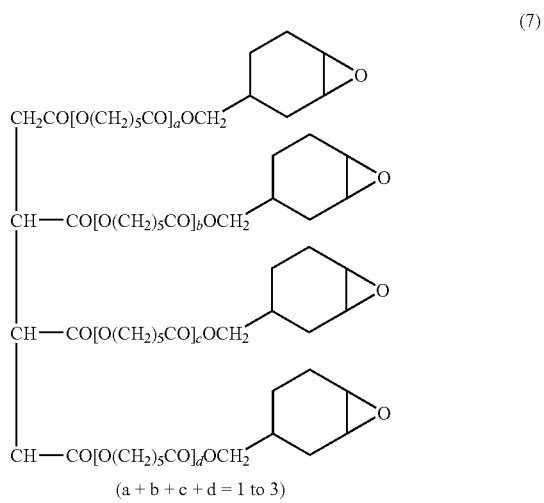

(7)

(a + b + c + d = 1 to 3)

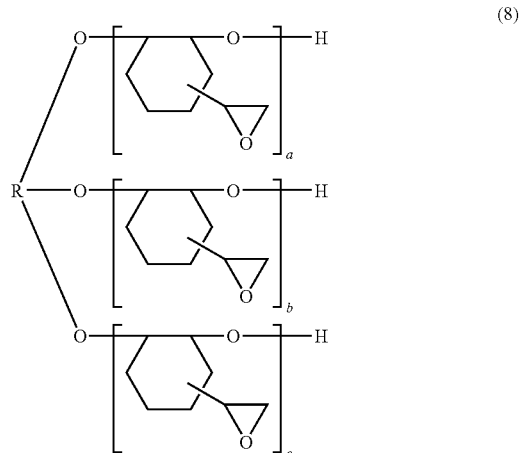

(8)

(a + b + c = n (integer), R: hydrocarbon group)

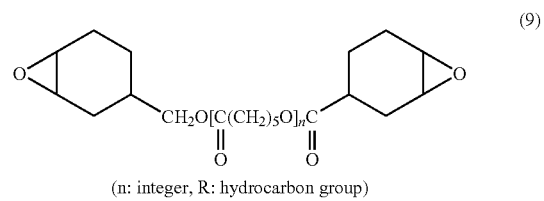

(9)

(n: integer, R: hydrocarbon group)

-continued

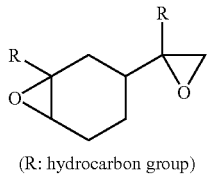

(R: hydrocarbon group)

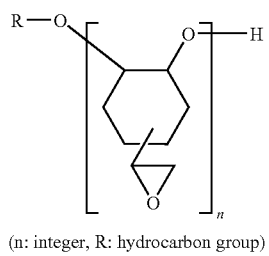

(n: integer, R: hydrocarbon group)

Among them, a compound represented by Formula (1), (7) or (11) is more preferably used since such a compound has an excellent compatibility with the aromatic PC resin of component (A) and does not impair the transparency of the PC resin composition.

The mixing amount of the alicyclic epoxy compound of component (G) is usually about 0.001 to about 1 part by mass, preferably 0.01 to 0.5 part by mass relative to 100 parts by mass of the aromatic PC resin of component (A). When the mixing amount is 0.001 part by mass or more, stream resistance can be imparted to the PC resin composition according to the present invention. On the other hand, when the mixing amount is 1 part by mass or less, the balance between the effect and the economic efficiency becomes satisfactory.

In the PC resin composition according to the present invention optionally various additives besides the above-noted components can be incorporated. Examples of the various additives include an antioxidant such as an antioxidant comprising hindered phenols or esters; a light stabilizer such as a light stabilizer comprising hindered amines; and an additive usually used such as a flame-retardant, a flame retarding auxiliary, a mold-releasing agent an antistatic agent, and a colorant.

The PC resin composition of the present invention can be produced by kneading according to a usually used method. For example, the kneading can be performed using a ribbon blender, a Henschel mixer a Banbury mixer, a drum tumbler, a single-screw extruder a twin-screw extruder, a Ko-kneader, a multi-screw extruder, or the like. It is appropriate that the kneading is usually performed at a heating temperature of about 240 to 280° C.

By molding the PC resin composition according to the present invention, a molded article such as a light diffuser panel can be produced. The light diffuser panel has usually a thickness of about 0.5 to about 2 mm, since, with such thickness, the light diffuser panel is unlikely to suffer a deflection or a warpage when the panel is assembled in a product.

The light diffusion plate can be advantageously used in the field of liquid crystal displays and for the applications, such as optical parts and replacement for glass articles. Examples of the above-noted optical parts include optical elements such as an optical lens, a light guide panel (light guides) and a light diffuser panel. Examples of the applications as replacements for glass articles include a cover for street lamp and a safety glass for vehicles and building materials.

EXAMPLES

Hereinafter, the present invention will be further described in detail referring to the following Examples, which should not be construed as limiting the scope of the present invention.

Types of the materials used in Examples and Comparative Examples are as follows. A maximum absorption wavelength of component (C) was measured by a method described below.

(A) Aromatic PC Resin
"TAFLON FN1700A" (trade name; manufactured by Idemitsu Kosan Co., Ltd., viscosity average molecular weight of 18,000, refractive index of 1.585).

(B) Light Diffusing Agent
Silicone resin particles (trade name: "KMP597"; manufactured by Shin-Etsu Chemical Co., Ltd., average particle diameter of 5 μm).

(C) Light-Resisting Agent
(1) Ultraviolet light absorber comprising a malonate (trade name: "HOSTAVIN B-CAP"; manufactured by Clariant International Ltd., maximum absorption wavelength at 320 nm (in dioxane solution)).
(2) Malonate type ultraviolet absorber (trade name; "HOSTAVIN RP-25"; manufactured by Clariant International Ltd. maximum absorption wavelength at 310 nm (cyclohexane solution)).
(3) Oxalic anilide type ultraviolet absorber (trade name "SANDUVOR VSU"; manufactured by Clariant International Ltd., maximum absorption wavelength at 300 nm (cyclohexane solution)).
(4) Ultraviolet light absorber comprising a acrylic polymer having a benzotriazole side chain (trade name: "ULS1635"; manufactured by Ipposha Oil Industries Co., Ltd., maxi mum absorption wavelength at 320 nm (in chloroform solution)).
(5) Ultraviolet light absorber comprising benzotriazole (low molecular weight compound) (trade name: "KEMISORB 79"; manufactured by Chemipro Kasei Kaisha, Ltd.; maximum absorption wavelength at 340 nm (in chloroform solution)).

(D) Acrylic Thermoplastic Resin
Polymethyl methacrylate (PMMA) (trade name "DIANAL BR-83"; manufactured by Mitsubishi Rayon Co., Ltd.; viscosity average molecular weight of 40,000).

(E) Stabilizer Comprising Phosphorus
Triphenyl phosphine (trade name "JC-260"; manufactured by Johoku Chemical Co., Ltd.).

(F) Organopolysiloxane having phenyl, methoxy, and vinyl groups (trade name "KR511;" manufactured by Shin-Etsu Silicone Co., Ltd.; refractive index of 1.518).

(G) Alicyclic Epoxy Compound
(trade name "Celloxide 2021P"; manufactured by Daicel Chemical Industries, Ltd., compound of Formula (2)).

Examples 1 to 9 and Comparative Examples 1 to 3

Components were blended according to the formulations shown in Table 1 and then kneaded using a single-screw extruder (die diameter of 40 mmφ) under the condition where the kneading temperature was 28° C. and the screw revolution number was 100 rpm, followed by pelletizing the resultant resin to obtain pellets. In Table 1, the value in % by mass for each additive is based on the amount of the PC resin.

Such pellets were molded using an injection molding machine under the condition where the molding temperature was 300° C. and the mold temperature was 100° C. to obtain a shaped article for evaluation (a 140 mm square plate with a thickness of 2 mm), which was evaluated according to the following methods. The results are shown in Table 1

(1) Color Tone Evaluation

A spectrophotometer (trade name: LCM2020 Plus; manufactured by Gretag-Macbeth Holding AG) was used to determine YI, chromaticity (x, y), and 400 nm light transmittance under the condition where the light source was an F light-source and the degree of the field was 10 degree.

(2) Light-Resistance Test

A light-resistance tester (trade name: UVCON UC-1; manufactured by ATLAS Co., Ltd.) was used to measure the color difference ΔE under the condition where the light source was a fluorescent LTV lamp; the temperature of the measuring atmosphere was 65° C.; and light-irradiating time was 24 hrs.

(3) Method for Measuring Ultraviolet Light Absorption Spectrum

A solution in which each ultraviolet light absorber was dissolved in a solvent which can dissolve the absorbers was placed in a quartz cell having a thickness of 1 mm and with respect to this solution, an ultraviolet absorption spectrum was measured using an ultraviolet-visible spectrometer (trade name: UV-2500P; manufactured by Shimadzu Corporation), to thereby determine wavelength for a maximum absorption

TABLE 1-1

| | PC Type | Light diffusing agent | | Light-resisting agent | | Thermoplastic acrylic resin | | Stabilizer 1 comprising phosphorus | |
|---|---|---|---|---|---|---|---|---|---|
| | | Type | Amount (% by mass) | Type | Amount (% by mass) | Type | Amount (% by mass) | Type | Amount (% by mass) |
| Example 1 | FC 1700 | KMP 597 | 2 | HOSTAVIN B-CAP | 0.3 | — | — | JC-263 | 0.03 |
| Example 2 | FC 1700 | KMP 597 | 2 | HOSTAVIN B-CAP | 0.3 | 1 | 0.1 | JC-263 | 0.03 |
| Example 3 | FC 1700 | KMP 597 | 2 | HOSTAVIN B-CAP | 0.3 | 1 | 0.1 | JC-283 | 0.03 |
| Example 4 | FC 1700 | KMP 597 | 2 | HOSTAVIN B-CAP | 0.3 | 1 | 0.1 | JC-263 | 0.03 |
| Example 5 | FC 1700 | KMP 597 | 2 | HOSTAVIN RP-25 | 0.4 | 1 | 0.1 | JC-263 | 0.03 |
| Example 6 | FC 1700 | KMP 597 | 2 | Sanduvor VSU | 0.3 | — | — | JC-263 | 0.03 |
| Example 7 | FC 1700 | KMP 597 | 2 | Sanduvor VSU | 0.3 | 1 | 0.1 | JC-263 | 0.03 |
| Example 8 | FC 1700 | KMP 597 | 2 | ULS1635 | 0.6 | — | — | JC-263 | 0.03 |
| Example 9 | FC 1700 | KMP 597 | 2 | ULS1635 | 0.6 | 1 | 0.1 | JC-263 | 0.03 |
| Comparative Example 1 | FC 1700 | KMP 597 | 2 | — | — | — | — | — | — |
| Comparative Example 2 | FC 1700 | KMP 597 | 2 | HOSTAVIN B-CAP | 0.001 | — | — | — | — |
| Comparative Example 3 | FC 1700 | KMP 597 | 2 | KEMISORB 79 | 0.3 | — | — | — | — |

| | Organo-polysiloxane | | Alicyclic epoxy resin | | Light | | | | |
|---|---|---|---|---|---|---|---|---|---|
| | Type | Amount (% by mass) | Type | Amount (% by mass) | YI | Chromaticity x | Chromaticity y | transmittance (400 nm) % | Light-Resistance (24 hrs irradiation) ΔE |
| Example 1 | — | — | — | — | 61.5 | 0.381 | 0.374 | 34 | 0.01 |
| Example 2 | — | — | — | — | 61.3 | 0.381 | 0.373 | 36 | 0.01 |
| Example 3 | 2 | 0.1 | — | — | 61.2 | 0.381 | 0.373 | 36 | 0.01 |
| Example 4 | 2 | 0.1 | 3 | 0.05 | 61.3 | 0.381 | 0.372 | 36 | 0.01 |
| Example 5 | — | — | — | — | 61.0 | 0.380 | 0.370 | 37 | 0.01 |
| Example 6 | — | — | — | — | 61.5 | 0.383 | 0.375 | 36 | 0.03 |
| Example 7 | — | — | — | — | 61.4 | 0.382 | 0.374 | 36 | 0.03 |
| Example 8 | — | — | — | — | 61.5 | 0.384 | 0.375 | 20 | 0.02 |
| Example 9 | — | — | — | — | 61.4 | 0.384 | 0.373 | 22 | 0.02 |
| Comparative Example 1 | — | — | — | — | 60.0 | 0.380 | 0.371 | 38 | 2.5 |
| Comparative Example 2 | — | — | — | — | 60.0 | 0.380 | 0.371 | 38 | 2.5 |
| Comparative Example 3 | — | — | — | — | 63.5 | 0.390 | 0.380 | 10 | 2.0 |

INDUSTRIAL APPLICABILITY

The polycarbonate light diffusing resin composition according to the present invention is advantageous for use in applications, such as light diffuser panels in the field of liquid crystal displays and the like; optical elements such as optical lenses, light guide panels (light guides) and light diffuser panels; and replacements for glass articles such as a cover for street lamps and a glass for vehicles and building materials.

The invention claimed is:

1. A polycarbonate light diffusing resin composition comprising:

(A) 100 parts by mass of an aromatic polycarbonate resin;

(B) 0.01 to 10 parts by mass of a light diffusing agent; and
(C) 0.05 to 5 parts by mass of a light-resisting agent having a maximum absorption wavelength at 290 to 330 nm in an ultraviolet absorption spectrum, wherein the light resisting agent (C) is benzylidenebisdiethyl malonate, 4-methoxyphenylmethylenedimethyl ester, an oxalylic anilide compound having a hydrocarbon group with 1 to 12 carbon atoms, or a 2-(5-tert-octyl-2-hydroxyphenyl) benzotriazole group bonded to a polymethylmethacrylate side chain.

2. The polycarbonate light diffusing resin composition according to claim 1, further comprising (D) 0.01 to 1 part by mass of a thermoplastic acrylic resin having a viscosity average molecular weight of 1,000 to 200,000.

3. The polycarbonate light diffusing resin composition according to claim 1, further comprising (E) 0.001 to 1 part by mass of a stabilizer comprising phosphorus.

4. The polycarbonate light diffusing resin composition according to claim 1, further comprising (F) 0.01 to 3 parts by mass of an organopolysiloxane having a refractive index, the difference between the refractive indices of the organopolysiloxane (F) and the aromatic polycarbonate resin of component (A) being 0.1 or less and/or (G) 0.001 to 1 part by mass of an alicyclic epoxy compound.

5. The polycarbonate light diffusing resin composition according to claim 1, wherein the light diffusing agent of component (B) is one or more selected from the group consisting of cross-linked polymethyl methacrylate resin particles, silicone resin particles, polyorganosilsesquioxane particles, silica particles, quartz particles, silica fibers, quartz fibers, and glass fibers.

6. The polycarbonate light diffusing resin composition according to claim 3, wherein the stabilizer comprising phosphorus of component (E) is one or more selected from the group consisting of phosphate compounds and aromatic phosphine compounds.

7. A light diffuser panel having a thickness of 0.5 to 2 mm obtained by molding the polycarbonate light diffusing resin composition according to claim 1.

8. The polycarbonate light diffusing resin composition according to claim 1, comprising 0.05 to 5 parts by mass of the light diffusing agent; and 0.1 to 3 parts by mass of the light-resisting agent.

9. A light diffuser panel having a thickness of 0.5 to 2 mm obtained by molding the polycarbonate light diffusing resin composition according to claim 8.

* * * * *